United States Patent
Silvain

(10) Patent No.: US 11,238,051 B2
(45) Date of Patent: Feb. 1, 2022

(54) METHOD AND APPARATUS FOR CHARACTERIZING AND DETERMINING RELATIONSHIPS BETWEEN ITEMS AND MOMENTS

(71) Applicant: Coravin, Inc., Burlington, MA (US)

(72) Inventor: Francois Claude Raoul Silvain, Winchester, MA (US)

(73) Assignee: Coravin, Inc., Bedford, MA (US)

( * ) Notice: Subject to any disclaimer, the term of this patent is extended or adjusted under 35 U.S.C. 154(b) by 718 days.

(21) Appl. No.: 16/104,428

(22) Filed: Aug. 17, 2018

(65) Prior Publication Data
US 2019/0213192 A1 Jul. 11, 2019

Related U.S. Application Data

(60) Provisional application No. 62/614,046, filed on Jan. 5, 2018.

(51) Int. Cl.
*G06F 16/00* (2019.01)
*G06F 16/2457* (2019.01)
*G06Q 30/02* (2012.01)
*G06Q 30/06* (2012.01)

(52) U.S. Cl.
CPC .. *G06F 16/24575* (2019.01); *G06F 16/24578* (2019.01); *G06Q 30/0278* (2013.01); *G06Q 30/0631* (2013.01)

(58) Field of Classification Search
CPC .............. G06F 16/24578; G06F 16/24575
USPC ................................................. 707/748, 798
See application file for complete search history.

(56) References Cited

U.S. PATENT DOCUMENTS

| | | |
|---|---|---|
| 4,803,641 A | 2/1989 | Hardy et al. |
| 5,200,909 A | 4/1993 | Juergens |
| 5,228,116 A | 7/1993 | Harris et al. |
| 9,025,742 B1 | 5/2015 | Cantu, II |
| 9,043,296 B2 | 5/2015 | Mital et al. |
| 9,178,933 B1 | 11/2015 | Soland |
| 9,201,866 B2 | 12/2015 | Lehman et al. |
| 9,558,243 B2 | 1/2017 | Koike et al. |
| 2001/0025279 A1 | 9/2001 | Krulak et al. |

(Continued)

FOREIGN PATENT DOCUMENTS

| | | |
|---|---|---|
| AU | 2015100536 A4 | 5/2015 |
| WO | WO 01/29734 A2 | 4/2001 |

OTHER PUBLICATIONS

International Search Report and Written Opinion for International Application No. PCT/US2018/067816, dated Mar. 13, 2019.

*Primary Examiner* — Alexandria Y Bromell
(74) *Attorney, Agent, or Firm* — Wolf, Greenfield & Sacks, P.C.

(57) ABSTRACT

A moment engine is arranged to characterize and/or determine relationships between items, such as a wine, or moments, such as an event, emotional experience and/or an activity. Characteristics for the items or moments may be used to define how the items or moments relate to a two-dimensional grid, e.g., to allow the items or moments to be displayed on an X-Y grid. Relationships between items and/or moments can be determined based on the item/moment characterization on the X-Y grid, e.g., to allow for the recommendation of an item for a particular moment, or the recommendation of a moment for a particular item.

35 Claims, 6 Drawing Sheets

| | | X | Y | WEIGHT X | WEIGHT Y | WEIGHTED X | WEIGHTED Y |
|---|---|---|---|---|---|---|---|
| WINE 2 | CLIMATE | 80 | 0 | 0.3 | 0 | 24 | 0 |
| | VINTAGE | 55 | 0 | 0.26 | 0 | 14.3 | 0 |
| | TREATMENT | 0 | 0 | 0.23 | 0 | 0 | 0 |
| | OLD V. NEW | 100 | 0 | 0.21 | 0 | 21 | 0 |
| | VARIETAL | 0 | 0 | -1.0 | 0 | 0 | 0 |
| | ALCOHOL LEVEL | 0 | 83 | 0 | 1.0 | 0 | 83 |
| | TOTAL | | | | | COMPOSITE X 59 | COMPOSITE Y 83 |

(56) References Cited

U.S. PATENT DOCUMENTS

| | | |
|---|---|---|
| 2004/0230440 A1 | 11/2004 | Malhotra |
| 2005/0288990 A1 | 12/2005 | Ballou et al. |
| 2006/0179055 A1 | 8/2006 | Grinsfelder et al. |
| 2008/0275761 A1 | 11/2008 | Seifer et al. |
| 2009/0210321 A1 | 8/2009 | Rapp |
| 2012/0185309 A1 | 7/2012 | Kakarla et al. |
| 2012/0226698 A1 | 9/2012 | Silvestre et al. |
| 2013/0339348 A1* | 12/2013 | Pickelsimer ....... G06Q 30/0631 707/723 |
| 2014/0012794 A1* | 1/2014 | Dillon ................. G06N 5/04 706/46 |
| 2014/0046660 A1 | 2/2014 | Kamdar |
| 2014/0095487 A1* | 4/2014 | Kurz ................. G06F 16/2453 707/722 |
| 2017/0148084 A1 | 5/2017 | Axelsson et al. |

* cited by examiner

| | | X | Y | WEIGHT X | WEIGHT Y | WEIGHTED X | WEIGHTED Y |
|---|---|---|---|---|---|---|---|
| WINE 2 | CLIMATE | 80 | 0 | 0.3 | 0 | 24 | 0 |
| | VINTAGE | 55 | 0 | 0.26 | 0 | 14.3 | 0 |
| | TREATMENT | 0 | 0 | 0.23 | 0 | 0 | 0 |
| | OLD V. NEW | 100 | 0 | 0.21 | 0 | 21 | 0 |
| | VARIETAL | 0 | 0 | -1.0 | 0 | 0 | 0 |
| | ALCOHOL LEVEL | 0 | 83 | 0 | 1.0 | 0 | 83 |
| | TOTAL | | | | | COMPOSITE X 59 | COMPOSITE Y 83 |

| CHARACTERISTIC | SCORE RANGE | SCORING RULES |
|---|---|---|
| CLIMATE | 0 TO 100 | = (T-MINT)/(MAXT-MINT) |
| VINTAGE | 0 TO 100 | =5 * MAX[(20-(CY-V), 0] |
| TREATMENT | 0 TO 100 | TREATMENT : 0, SOME TREATMENT : 1, NO TREATMENT 2<br>= 50 * [TREATMENT AMOUNT] |
| OLD VS. NEW WORLD | 0 TO 100 | OLD WORLD : 0, NEW WORLD : 100 |
| VARIETAL | 0 TO 24 | VARIETY A : 0, VARIETY B : 12, VARIETY C : 24 |
| ALCOHOL LEVEL | 0 TO 100 | = [ALCOHOL SCORE] * 16.667<br>10% : 0, 11% : 1, 12% : 2, 12.5% : 3, 13.5% : 4,<br>14.5% : 5, 16% : 6 |

Figure 5

| CHARACTERISTIC | X VALUE | Y VALUE | X WEIGHT | Y WEIGHT |
|---|---|---|---|---|
| MED. SALAD | 75 | 75 | 35 | 35 |
| PIE CRUST | 75 | 50 | 0.1 | 0.1 |
| GRANOLA | 80 | 40 | 0.1 | 0.1 |
| SMOKE | 25 | 25 | 10 | 10 |
| COMFORT | 50 | 50 | 100 | 100 |
| SALSA | 50 | 50 | 0.2 | 0.2 |
| ... | | | | |

METHOD AND APPARATUS FOR CHARACTERIZING AND DETERMINING RELATIONSHIPS BETWEEN ITEMS AND MOMENTS

CROSS REFERENCE TO RELATED APPLICATION

This Application claims priority under 35 U.S.C. § 119(e) to U.S. Provisional Application No. 62/614,046, filed Jan. 5, 2018, which is herein incorporated by reference in its entirety.

BACKGROUND OF INVENTION

This invention relates generally to systems and method for characterizing items and/or moments (events, emotional experiences or activities) and spatially mapping the items and/or moments, e.g., for recommending a food that has a relationship to the event, experience or activity.

SUMMARY OF INVENTION

While systems have been described that correlate wine characteristics, such as taste or smell features, to other foods, e.g., to make a recommended wine/food pairing, the inventors have appreciated that systems do not exist for making a wine or other food recommendation based on a correlation of characteristics of the wine or other food to features of an event, emotional experience or activity, such as the general climate during a holiday or how a person feels emotionally while touring an historic site. For example, some systems have been described that associate particular products or services to particular events for the purpose of providing targeted advertising, such systems that simply correlate the product or service (such a "beer") to the event (such as "a sporting event") and take action to provide a "beer" advertisement to a person attending a "sporting event." Such systems do not, however, map characteristics of a product, such as taste characteristics of a wine, to features of an event, emotional experience or activity, such as the typically warm temperatures, smell of sun tan lotion, and salty taste commonly associated with a beach visit. Systems and methods in accordance with at least some aspects of the invention do precisely this and can provide for unique and unexpected wine or other food recommendations for a variety of different events, emotional experiences or activities, including those are typically not considered for a food recommendation, such as a flat tire event, a child birth, or canoe trip. Thus, systems and methods in accordance with aspects of the invention can provide for unique food recommendations for a wide variety of "moments" in a person's life, creating memory associations for even the most unexpected of times.

As used herein, a "moment" is an event (such as a holiday, sporting match, birthday party, etc.), an emotional experience (such as a wedding engagement, firing from a job, winning a game, etc.) and/or an activity (such as a hiking trip, a picnic, watching a movie, reading a book, visiting a museum, listening to music, playing a board game, etc.). Of course, as can be seen from the examples above, a "moment" may be any one or more of an event, emotional experience and activity (e.g., winning a gold medal at a major track and field competition could be all three). Systems and methods in accordance with aspects of the invention may map characteristics of wine or other food, such as taste features like "spicy" or "fruity" or "sweet", appearance features like "light red" or "white", region of origination features like "France" or "Napa valley", and others to features of "moments" like "sunny" for a beach visit activity, or "somber" to a funeral experience, or "energetic" to a boxing match. Such mapping may allow for a correlation or other relationship of a particular wine or set of wines (or other foods) to a "moment" so that a person may be provided with a unique, appropriate, enjoyable, and/or memorable experience as complemented or augmented by the recommended food. The mapping may also allow a person to determine which "moments" are best suited for foods the person already has, such as a wine in the person's current collection.

Although several examples are described involving food items, such as wine, aspects of the invention can be used with any physical thing. That is, any physical thing, not just a food item, can be characterized and mapped using various features described herein, and relationships identified between the physical things and one or more moments (or other physical things). As an example, a bouquet of flowers can be characterized using inventive techniques and then mapped to determine a relationship with one or more moments and/or one or more other physical things. Thus, aspects of the invention are not limited to determining relationships between wines and other food items and moments.

In accordance with aspects of the invention, one or more foods (or other items) may be associated with one or more item characteristics, such as taste characteristics (sweet, tart, salty, hot, cold, fruity, astringent, bitter, bland, etc.), appearance characteristics (color, opacity, viscosity, etc.), region of origin characteristics (country or region where the food was made or otherwise originated, climate of region of origin, etc.), price, other foods that pair well with this food, and others. Such associations may be direct, or one-to-one, e.g., a wine that is red in color and fruity in taste may be associated with only item characteristics "red" and "fruity" but no others. Or such associations may be weighted, e.g., using a factor that indicates how closely the food is associated with each of a plurality of item characteristics. For example, the wine that is red in color and fruity in taste may have a weighting value of "1" for item characteristics "red" and "fruity," a weighting value of "0" for the food characteristic "white," but have a weighting value of 0.5 for the food characteristic "sweet" because the wine may be somewhat sweet but not as sweet as other wines. (In this example, a weighting value of 1 indicates a strong correlation, whereas 0 indicates a weak correlation, with values between 0 and 1 providing a relative correlation scale. Of course, other numbering arrangements or scales may be used.)

Similarly, one or more moments may be correlated with moment characteristics such as emotional state (excited, bored, depressed, exhilarated, happy, etc.), typical weather or climate (wet, dreary, sunny, warm, hot, icy, etc.), cultural tastes (e.g., of foods associated with the moment, such as spicy, greasy, salty, etc.), location (outdoors, indoors, Southern hemisphere, mountains, lakefront, a particular country, etc.), time/date (such as day of year, time of day, etc.), concepts associated with the moment (such as academic, highbrow, comfort, friendly, etc.) and other features. As with item characteristics, a correlation between moments and moment characteristics may be direct/one-to-one, or may be weighted in some way. For example, a "birthday party" moment may be correlated with the moment feature "outdoor" using a weighting value or weighting of "0.2" and correlated with the moment feature "indoor" using a weighting value of "0.8" since many birthday parties occur indoors, although some are outdoors. Also, weighting value may be adjusted based on other correlation information, e.g., a weighting value between "birthday party" and the moment feature "indoor" may be increased if the "birthday party" is correlated more strongly with an evening time of day (because a birthday party held at night may be more likely to be indoors).

Using the correlations between items and item characteristics and between moments and moment characteristics, a mapping engine may determine relationships between one or more items and one or more moments. The mapping engine may determine relationships between an item and a moment in different ways, and in some embodiments can identify matches between item characteristics associated with the item and moment characteristics associated with the moment to identify an item that has a strong relationship to a moment. For example, if a wine is associated with the item characteristic "fruity" and a moment such as "apple picking" is associated with the moment feature "fruity," the mapping engine may determine that the wine has a strong relationship with the moment to suggest the wine for the activity "apple picking." However, the mapping engine may operate in other ways to determine relationships between an item and a moment, and may require a particular threshold of item characteristic/moment feature correlation before determining a sufficient relationship exists between the item and moment to suggest the item accompany the moment is some way. For example, the simple match of food characteristic "fruity" and moment feature "fruity" may not be enough to suggest a particular wine for the "apple picking" activity. Instead, two or more matches or correlations of food characteristic to moment feature may be required, e.g., a wine may have to be associated with item characteristics "fruity" and "tart" to have a sufficient relationship to the "apple picking" moment to warrant a recommendation from the mapping engine. (In this case, "apple picking" would be correlated with the moment characteristics "fruity" and "tart" as well, and a comparison of the characteristics to which the wine and "apple picking" are correlated would elicit the relationship.)

The mapping engine may employ more complex analyses to identify correlations between item characteristics and moment characteristics to identify item/moment relationships. For example, rather than identify matches between item characteristics and moment characteristics on a textual basis, the mapping engine may assess the meaning of item characteristic and moment feature terms (using dictionary definitions, synonym lists, natural language assessment tools, etc.) and determine a correlation between food characteristic and moment feature terms where those terms have a similar meaning or otherwise associated in some way. For example, a food may be correlated with the food characteristic "hot" or "heat" and a moment may be correlated with the moment feature "sunny." The mapping engine may determine that the terms "hot" and "sunny" are strongly correlated, at least to some extent, and thus assess a relationship between the corresponding food and moment based on that correlation as well as correlations between other item characteristics and moment characteristics for the food and moment. As an example, the food above may also be correlated with the food characteristic "salty" and the moment may be correlated with the moment feature "beach." The mapping engine may determine a strong correlation between the terms "salty" and "beach" (e.g., because beaches are often associated with salt water), and in combination with the correlation of "hot" and "sunny" above, the mapping engine may determine that a sufficient relationship exists between the food and the moment to recommend the food, whether for consumption while experiencing the moment or later while recalling the moment. Of course, similarities in food characteristic and moment feature terms need not be an only basis on which the mapping engine determines relationships. For example, many people enjoy food combinations that mix salty and sweet flavors. Thus, a moment (such as touring a candy making facility) that is correlated with the moment feature "sweet" may be determined to have a strong relationship with a food that is correlated with the food characteristic "salty."

As noted above, correlations between item characteristics and moment characteristics may be determined by the mapping engine based on simple matching or textual analysis (identifying terms with similar meaning or with meanings that somehow complement each other), but correlations may be determined in other ways. For example, a user and/or developer of a system that employs the mapping engine to make a food recommendation for a moment (or vice versa to identify a moment suited to food a person already has) may provide information that is used to correlate item characteristics with moment characteristics. As merely one example, a developer may arbitrarily assign a correlation value of 0.6 to the food characteristic "bitter" and the moment feature "sweet," and a correlation value of 0.7 to the food characteristic "astringent" and the moment feature "mountains." Other arbitrary correlations between item characteristics and moment characteristics may be provided as well. Such correlations may provide unexpectedly effective recommendations of food for particular moments, or recommendations of moments for particular foods. Note also that the mapping engine may employ a neural network or other learning-type or trainable system that can be provided with particular foods and moments that have predefined relationship strengths for training. These predefined relationship strengths can be used by the mapping engine to determine suitable correlation factors between item characteristics and moment characteristics so that the mapping engine is trained or learns to provide desired relationship results for item/moment combinations. For example, with a set of foods and moments stored in a database along with correlated item characteristics and moment characteristics for those foods and moments, the mapping engine may determine correlations between item characteristics and moment characteristics by learning or training so that if the mapping engine were provided with a moment and asked to indicate a food with a strong relationship to the moment, the mapping engine can use the trained system to determine the food(s) that were predetermined at the training stage to have a strong relationship with the moment. (Note that the mapping engine may also adjust correlation values between foods and item characteristics, and between moments and moment characteristics during the training process.) Moreover, the mapping engine can be refined in its learning or training, e.g., based on later provided user information suggesting that the relationship information between foods and moments originally provided to the system for training should be adjusted in some way. As an example, system developers may originally train the system so that Wine 1 has a stronger relationship to Moment A than Wine 2. However, users may indicate that Wine 2 actually is better suited for Moment A than Wine 1, and the mapping engine may be adjusted in operation (e.g., by adjusting correlation values for item characteristics and moment characteristics) so that the mapping engine will return a stronger relationship between Wine 2 and Moment A than between Wine 1 and Moment A in later operations.

A system in accordance with aspects of the invention may be implemented on one or more computers, and may be arranged to provide item recommendations for user-defined moments, and/or to provide moment recommendations for user-defined items. In one embodiment, users of the system may interact with a user interface, e.g., implemented on a user's smartphone or other computer. The user may identify an item (or moment) and request a recommended moment (or item). A mapping engine, using stored item/item characteristic information and moment/moment feature information and operating on the user's computer or a remote computer connected by a network, may receive the user-supplied item information and determine a recommendation using one or more processes described above. The mapping engine may request and receive additional information from the user, e.g., the user may identify a particular food, and the mapping engine may ask whether the user would like to receive a recommended moment to occur within some future timeframe, such as within 4 hours, or 2 weeks or 1 year. The mapping engine may use this additional information to help identify a suitable moment for the user-identified food. The user may also interact with the user interface to help train the mapping engine, e.g., by providing feedback regarding the suitability of a recommended food for a user-defined moment. The mapping engine may use this information to adjust operation of the system.

In some embodiments, items and/or moments can be mapped onto a two-dimensional grid based on correlation values for one or more characteristics. This type of mapping can allow for a display of one or more items on the two-dimensional grid (referred to herein as an X-Y grid), thus allowing a user to visualize where items lie in a spatial context. This can be useful to give a user a visual sense of the characteristic(s) of an item. As an example, one or more wines may be mapped onto an X-Y grid based on correlation values for one or more characteristics of the wine, such as alcohol level, whether the wine was subjected to a treatment or not (e.g., whether the wine was aged with oak or not), a vintage or year bottled, a climate where the grapes were grown to make the wine, etc. This can allow a user to visualize where a wine or set of wines fall on the X-Y grid, and allow a user to identify whether the wine may be suitable for a particular purpose. As an example, a user may know that she typically enjoys wines that are in the upper right quadrant of an X-Y grid. Thus, if a wine the user is unfamiliar with maps into the upper right quadrant of the X-Y grid, the user may have some confidence that this unknown wine will be enjoyed as well. An X-Y grid display of multiple wines, such as wines in a user's cellar, may help the user identify where significant holdings are located on the X-Y grid and whether wines in certain areas of the X-Y grid may need to be supplemented.

In some embodiments, the indication for an item, such as a bottle of wine, on an X-Y grid may include a color or other visual indication that helps to indicate X and Y correlation values for the item. For example, an X-Y grid display for white wines may be arranged so that X correlation values are associated with a blue color and Y correlation values are associated with a green color. Higher correlation values may be associated with a darker shade of the color than lower correlation values, e.g., relatively lower X correlation values may be light blue and higher X correlation values may be darker blue. Similar may be used for Y correlation values, e.g., light green to dark green. Thus, if a white wine falls within an upper right quadrant of the X-Y grid, the indication for the wine may be a combination of dark blue and green, but if a wine falls in the lower left quadrant, the indication may be a combination of light blue and green. This gradient in display for X and Y axes may help a user more easily identify characteristics of a wine or other item.

As with wines and other items, moments may be mapped on an X-Y grid as well. This mapping may be done in a similar way as with wines or other items, but the characteristics used to map the moments may be different, or they may be the same, or may have at least some of the same or similar characteristics. For example, while a wine may be mapped based on characteristics of vintage, alcohol level and climate, a moment may be mapped on the same X-Y grid but using different (at least in part) characteristics. As an example, a trip to the beach moment may be mapped based on characteristics of salty, hot, dry, coconut, crashing wave sounds, etc. Though a particular wine and moment may be mapped using different characteristics, they may end up mapped to the same location on the X-Y grid, which may indicate a relationship between the two. This relationship may be suitable to suggest a pairing of the two, e.g., a pairing recommendation that the wine and a trip to the beach should be enjoyed together. Note that a mapping system can not only provide information that particular wines and moments are suitable for each other, but also can recommend a particular wine (or moment) in response to a user requesting a pairing for a particular moment (or wine).

In one aspect of the invention, a system for mapping an item or moment on an X-Y grid includes a characteristic module arranged to generate and store X and Y correlation values for each characteristic in a set of characteristics for each of a plurality items or moments, where each moment is an event, an emotional experience and/or an activity. A mapping engine may be arranged to determine composite X and Y values for each of the plurality of items or moments based on the X and Y correlation values for each characteristic in the set of characteristics for the item or moment, and a user interface may be arranged to display information on the X-Y grid indicating the composite X and Y values for at least some of the items or moments, or to provide information regarding a relationship between at least two items or moments based on the composite X and Y values for the at least two items or moments. The system may be implemented, at least in part, on a computer or other data processing system.

In one embodiment, the characteristic module is arranged to generate and store a weighting value for each X and Y correlation value for each characteristic, and the mapping engine is arranged to determine the composite X and Y values for each of the plurality of items or moments based on the X and Y correlation values and the weighting value for each X and Y correlation value. The user interface may display information on the X-Y grid indicating the composite X and Y values for at least some of the items or moments. For example, the user interface may provide information regarding a relationship between at least two items or moments based on the composite X and Y values for the at least two items or moments.

In one embodiment, the characteristic module is arranged to generate and store X and Y correlation values for each characteristic in a set of characteristics for a plurality of wines. For example, the set of characteristics may include climate, vintage treatment, new vs. old world, varietal and alcohol level features of the wine or otherwise associated with the wine. In one embodiment, the X correlation values for the characteristic of alcohol level for the wines are equal to zero, and Y correlation values for characteristics of climate, vintage treatment, new vs. old world and varietal for the wines are equal to zero. Thus, an alcohol level characteristic may be represented by information on the Y axis, and other characteristic information may be represented in a combined way on the X axis. The characteristic module may be arranged to generate and store a weighting value for each X and Y correlation value for each characteristic for the wines, and the mapping engine may be arranged to determine the composite X and Y values for each of the plurality of wines based on the X and Y correlation values and the weighting value for each X and Y correlation value. The user interface may be arranged to display an indication for each of the plurality of wines on the X-Y grid that corresponds to the composite X and Y values for each of the plurality of wines.

In another embodiment, the characteristic module is arranged to generate and store X and Y correlation values for each characteristic in a set of characteristics for a plurality of moments, e.g., along with X and Y correlation values for characteristics for a plurality of wines. The set of characteristics for each of the plurality of wines may be different than the set of characteristics for each of the plurality of moments. The user interface may be arranged to provide information regarding a relationship between wine and a moment based on the composite X and Y values for the wine and the moment, e.g., based on a comparison of the composite X and Y values. In some cases, the user interface is arranged to recommend a pairing of the wine and the moment based on the composite X and Y values for the wine and the moment. For example, the user interface may be arranged to recommend the pairing if a difference between the composite X and Y values for the wine and the moment is below a threshold. In some embodiments, the user interface is arranged to receive information from a user identifying the wine and a request for a recommended pairing for the wine, the user interface can identify the moment for the recommended pairing based on a comparison of the composite X and Y values for the wine with the composite X and Y values for the moment, and can indicate the moment as a recommended pairing for the wine based on the comparison. Alternatively, or additionally, the user interface can receive information from a user identifying the moment and a request for a recommended pairing for the moment, can identify the wine for the recommended pairing based on a comparison of the composite X and Y values for the moment with the composite X and Y values for the wine, and can indicate the wine as a recommended pairing for the moment based on the comparison.

In some embodiments, the user interface is arranged to display information on the X-Y grid indicating the composite X and Y values for at least some of the items or moments, with each of the X and Y axes of the grid corresponding to first and second color gradients, respectively, and the information indicating composite X and Y values for an item or moment including a combination of the first and second color gradients. For example, the first and second color gradients may vary from a lighter shade to a darker shade with increasing values for the composite X and Y values, respectively. Thus, the user interface may display information on the X-Y grid indicating the composite X and Y values for a plurality of wines employing the color gradient scheme.

In another aspect of the invention, a computer-implemented method for mapping an item or moment on an X-Y grid includes generating X and Y correlation values for each characteristic in a set of characteristics for each of a plurality items or moments, where each moment is an event, an emotional experience and/or an activity, determining composite X and Y values for each of the plurality of items or moments based on the X and Y correlation values for each characteristic in the set of characteristics for the item or moment, and displaying information on the X-Y grid indicating the composite X and Y values for at least some of the items or moments, or providing information regarding a relationship between at least two items or moments based on the composite X and Y values for the at least two items or moments. The set of characteristics for each of the plurality of wines may be different than the set of characteristics for each of the plurality of moments. In some embodiments, the step of generating X and Y correlation values includes generating a weighting value for each X and Y correlation value for each characteristic, and the step of determining composite X and Y values includes determining the composite X and Y values for each of the plurality of items or moments based on the X and Y correlation values and the weighting value for each X and Y correlation value. The step of determining composite X and Y values may include, for each item or moment, multiplying each X and Y correlation value by the corresponding weighting value to determine weighted X and Y correlation values, and adding the weighted X and Y correlation values to determine the composite X and Y values.

Where information is displayed, the step of displaying information on the X-Y grid includes displaying information on the X-Y grid indicating the composite X and Y values for at least some of the items or moments. Where relationship information is provided, the step of providing information regarding a relationship includes providing information regarding a relationship between at least two items or moments that have similar composite X and Y values.

In one embodiment, the step of generating X and Y correlation values includes generating X and Y correlation values for each characteristic in a set of characteristics for a plurality of wines. For example, the set of characteristics may include climate, vintage treatment, new vs. old world, varietal and alcohol level. In some cases, the X correlation values for the characteristic of alcohol level for the wines are equal to zero, and Y correlation values for characteristics of climate, vintage treatment, new vs. old world and varietal for the wines are equal to zero.

In some embodiments, the step of generating X and Y correlation values includes generating a weighting value for each X and Y correlation value for each characteristic for the wines, and the step of determining the composite X and Y values for each of the plurality of wines includes determining the composite X and Y values based on the X and Y correlation values and the weighting value for each X and Y correlation value. An indication for each of the plurality of wines on the X-Y grid may be displayed that corresponds to the composite X and Y values for each of the plurality of wines. Similarly, the step of generating X and Y correlation values may include generating X and Y correlation values for each characteristic in a set of characteristics for a plurality of moments, and weighting values may be used. Information regarding a relationship between a wine and a moment may be provided based on a comparison of the composite X and Y values for the wine and the moment. In some cases, the step of providing information regarding a relationship includes recommending a pairing of the wine and the moment based on the composite X and Y values for the wine and the moment. For example, a pairing may be recommended if a difference between the composite X and Y values for the wine and the moment is below a threshold.

In some embodiments, information may be received from a user identifying a wine and a request for a recommended pairing for the wine, and the step of providing information regarding a relationship may include identifying a moment for the recommended pairing based on a comparison of the composite X and Y values for the wine with the composite X and Y values for the moment. Similarly, information may be received from a user identifying a moment and a request for a recommended pairing for the moment, and the step of providing information regarding a relationship may include identifying a wine for the recommended pairing based on a comparison of the composite X and Y values for the moment with the composite X and Y values for the wine.

Information may be displayed on the X-Y grid indicating the composite X and Y values for at least some of the items or moments, e.g., for wines, with each of the X and Y axes of the grid corresponding to first and second color gradients, respectively, and the information indicating composite X and Y values for an item or moment including a combination of the first and second color gradients. For example, the first and second color gradients vary from a lighter shade to a darker shade with increasing values for the composite X and Y values, respectively.

Various exemplary embodiments of the device are further depicted and described below.

BRIEF DESCRIPTION OF THE DRAWINGS

Aspects of the invention are described with reference to various embodiments, and to the figures, which include:

FIG. 5 shows a table of characteristics used for characterizing wine in an illustrative embodiment;

DETAILED DESCRIPTION

Aspects of the invention are described below with reference to illustrative embodiments, but it should be understood that aspects of the invention are not to be construed narrowly in view of the specific embodiments described. Thus, aspects of the invention are not limited to the embodiments described herein. It should also be understood that various aspects of the invention may be used alone and/or in any suitable combination with each other, and thus various embodiments should not be interpreted as requiring any particular combination or combinations of features. Instead, one or more features of the embodiments described may be combined with any other suitable features of other embodiments.

Figure 1:
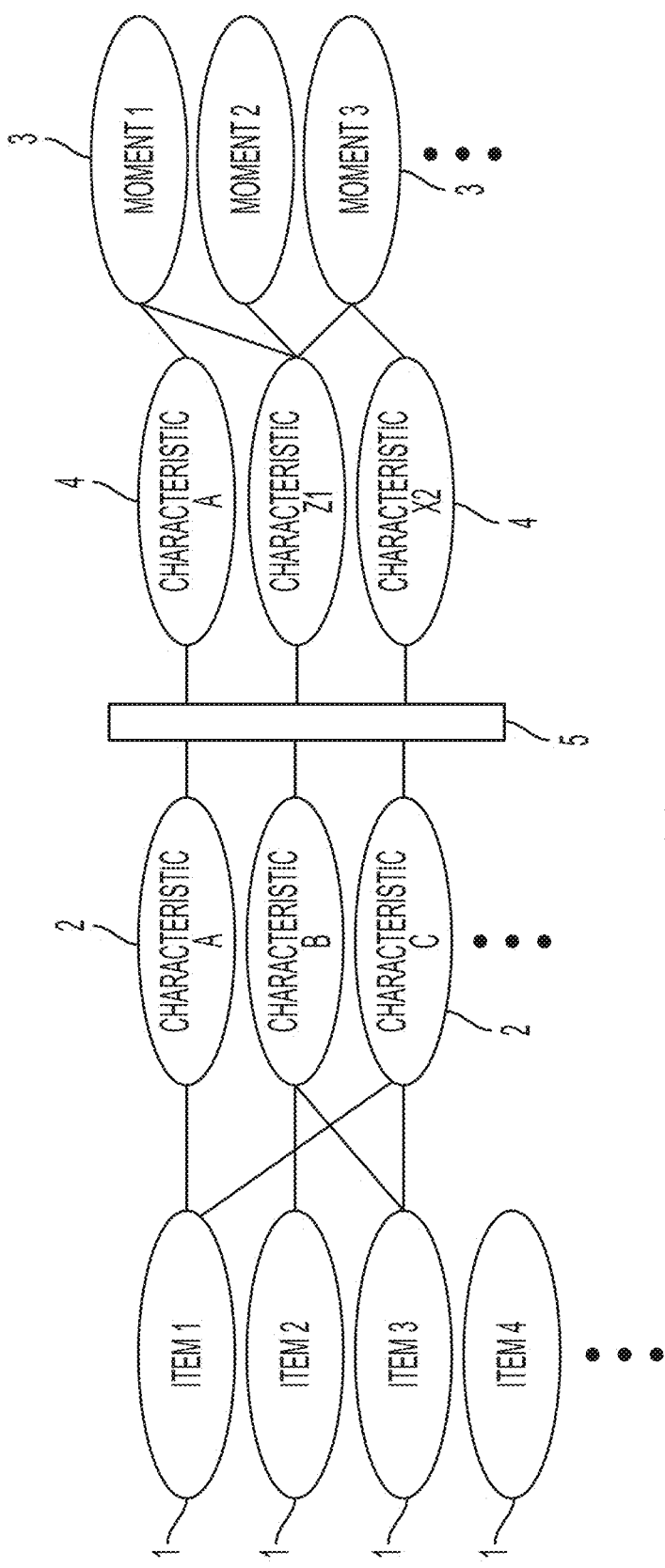
FIG. 1 shows a schematic diagram depicting a plurality of items, item characteristics, moments and moment characteristics, and a mapping engine for determining relationships between foods and moments.

FIG. 1 shows a schematic diagram depicting a plurality of items 1 and item characteristics 2, a plurality of moments 3 and moment characteristics 4, and a mapping engine 5 for mapping item characteristics and moment characteristics. As described in more detail below, the mapping engine 5 is used to determine relationships between items 1 and moments 3, e.g., so that an item 1 having the strongest relationship to a moment 3 based on the mapping of corresponding item characteristics 2 and moment characteristics 4 can be identified. For example, a user may wish to identify a wine that has a strong relationship to a particular moment, such as an automobile flat tire event, so the user can enjoy the wine during or while later reflecting on the moment. In this illustrative embodiment, the items 1 are wines, but any food or other item or service may be used with the system. As shown in FIG. 1, a plurality of items 1 are identified, e.g., a plurality of wines are stored in a database with corresponding information to identify the wine such as vineyard name, vintage year, an image of the bottle label, a food identification number, etc. As an example, all of the wines available at a restaurant or at a wine vendor or in a user's cellar may be stored in the database along with their location in the restaurant/store/cellar. Also stored in a computer database are a plurality of item characteristics 2, which may include taste characteristics of the wines, appearance characteristics, region of origin characteristics, vintage, type of grapes used, alcohol level, price, foods that pair nicely with the wine, and so on. For example, characteristics 2 such as "red", "white", "rosé", "fruity", "sweet", "dry", "acidity", "bitterness", "high heat", "salty", "astringent", and/or other known or as yet undefined characteristics of wine may be stored. Each item 1, in this case wine, may be correlated or associated with one or more item characteristics 2. For example, a wine 1 which is red in color, fruity in taste and having a relatively high "heat" (possibly due to alcohol content) may be correlated with corresponding item characteristics 2. In some cases, the correlation between wine 1 and food characteristic 2 may be represented by a correlation or weighting value that represents how strongly (or weakly) the wine 1 correlates with each food characteristic 2. As an example, a wine that is red in color may have a correlation or weighting value of "1" with the food characteristic "red" but a correlation or weighting value of "0" with the food characteristic "white." A wine that is rose in color may have a correlation or weighting value of 0.5 with item characteristics "red" and "white" but have a correlation or weighting value of 1 for the food characteristic "rose." In this way, each wine 1 may have a set of corresponding item characteristics 2 that are somehow correlated or associated with the wine so as to define a set of characteristics of the wine. Lines joining items 1 with item characteristics 2 in FIG. 1 are intended to schematically illustrate such correlations.

Similarly, a plurality of moments 3 may be stored in a computer database along with a plurality of moment characteristics 4. The moments 3 may include various events (sporting matches, religious and non-religious holidays, etc.), emotional experiences (firing from a job, being hired to a job, getting married, child birth, etc.) and/or activities (fishing, playing cards, baking cookies, listening to any of a variety of styles of music, or watching a particular movie or show on a screen, etc.). A plurality of moment characteristics 4 may be stored as well and correlated or associated with moments 3 in a way similar to that for items 1 and item characteristics 2. As an example, a "Cinco de Mayo" holiday event could be correlated to "Mexican" and "spicy" and "food" as well as other moment characteristics 4. Again, a correlation or weighting value could be used to associate moments 3 with moment characteristics 4, e.g., the "Cinco de Mayo" event may have a correlation or weighting value of 1 with the moment feature "Mexico" (since it is a Mexican holiday), a correlation or weighting value of 0 with the moment feature "China", but a correlation or weighting value of 0.5 with the moment feature "France" (because the holiday is not typically associated with France, but does celebrate a Mexican victory over French forces). Similarly, a "4th of July" event could be corresponded with "food" and "grill" and "sunny" and "USA" either on a direct, one-to-one basis and/or using a correlation or weighting factor. Correspondence between other moments 3 and moment characteristics 4 will be appreciated by those of skill in the art. For example, a "playing cards" moment may be correlated with moment characteristics of "small groups of people" and "physically inactive" and "social" and "fun." Thus, the set of moment characteristics 4 corresponded to each moment 3 may in effect define the nature of the moment in any suitable terms.

The mapping engine 5 may determine a correspondence or other relationship between a wine 1 and a moment 3 based on correlations or associations between item characteristics 2 and moment characteristics 4. In some embodiments, determining a relationship between a wine 1 (or other food) and a moment 4 may be relatively simple and based on matching of item characteristics 2 and moment characteristics 4. For example, in the "Cinco de Mayo" moment mentioned above, a wine that is associated with the item characteristics 2 of "Mexican" (because the wine is made in Mexico) and "spicy" may be determined to have a strong relationship to the "Cinco de Mayo" event which is associated with moment characteristics 4 of "Mexican" and "spicy." However, the mapping engine 5 need not operate by identifying matching item characteristics 2 and moment characteristics 4 to determine a relationship between an item 1 and a moment 4. In other cases, the mapping engine 5 may define correlations between item characteristics 2 and moment characteristics 4 that do not match each other in a textual sense. For example, as noted above a "4th of July" event could be corresponded with the characteristics of "food" and "grill" and "sunny" and "USA." The mapping engine 5 may define a correlation between the moment characteristics 4 of "food" and "sunny" with the item characteristics 2 of "fruity" and "crisp," respectively. Obviously, these terms do not match, but may be defined to share a relationship with each other, at least to some extent. Based on this mapping, a wine associated with the item characteristics 2 of "fruity" and "crisp" may be identified as having a strong relationship to the 4th of July, and thus recommended for a 4th of July event (or vice versa). Those of skill will appreciate that mapping of this type may be done in a variety of different ways, such as by a user or system developer defining a relationship between item characteristics and moment characteristics, by receiving user input that defines a relationship between item characteristics and moment characteristics, by employing a neural network or learning-type system that can be trained to identify correlations between item characteristics and moment characteristics based on user feedback (e.g., indicating that a wine or other food recommended for a moment was or was not perceived as suitable), and others.

In some embodiments, items and/or moments may be mapped in relation to a two-dimensional plane or grid, called an X-Y grid herein. This may allow for the visualization of how items and moments are characterized, as well as allow relationships to be determined and/or visualized between items and/or moments, particularly where the items and moments are characterized using different sets of characteristics. For example, a wine may be mapped to an X-Y grid so that the wine is "located" in an upper right quadrant of the X-Y grid. A moment may be mapped to the same location, albeit based on a different set of characteristics, allowing for a relationship to be determined between the wine and the moment. As will be understood, this can allow a wide variety of different items and/or moments to be mapped on a same X-Y grid even when using different characteristics to map the items and moments. This approach can also allow for a specific type or class of items or moments, e.g., different types of wine, to be mapped to an X-Y grid so that differences and/or similarities between the wines can be visualized or otherwise assessed.

Figure 2:
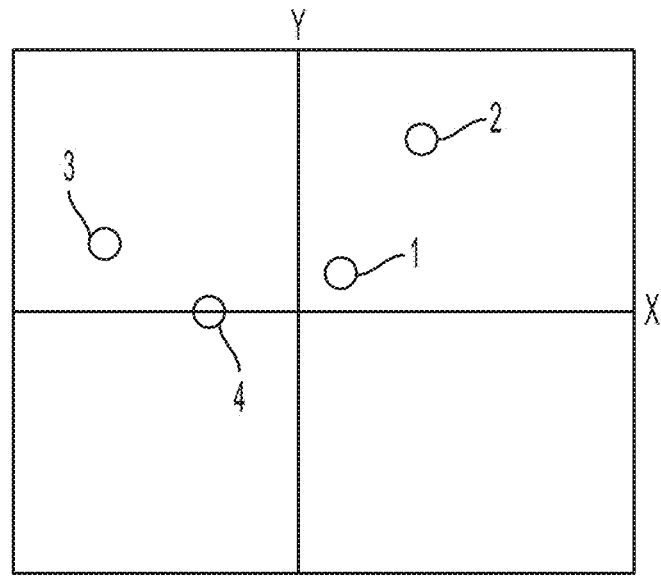
FIG. 2 shows an X-Y grid with four wines displayed according to their respective composite X and Y values.

FIG. 2 shows an illustrative mapping of a plurality of wines on an X-Y grid. A first wine, Wine 1 is located in the upper right quadrant along with a second wine Wine 2. A third wine, Wine 3 is located in the upper left quadrant, and a fourth wine Wine 4 is located along the X axis to the left of the Y axis, i.e., between the upper and lower left quadrants. FIG. 2 also shows the composite X and Y correlation values for each of Wines 1-4 that were used to plot each wine on the X-Y grid. While the table of composite X and Y correlation values show the same general information as the X-Y grid, the illustration in the X-Y grid may be easier for some users to assess the relative characteristics of wines (or other items), e.g., may allow for much easier identification of similar wines particularly when there are a large number of wines in the table and X-Y grid display. While in FIG. 2, each wine indication includes a simple "dot" type indication, wine indications may include any suitable information. For example, a wine indication on the X-Y grid may include a color, such as a red dot for red wine and a white dot for a white wine, etc. Other examples include an icon, logo, name or initials that indicate a type of wine ("C" for cabernet, "SB" for sauvignon blanc, etc.), a vineyard or brand of the wine, and so on. In one embodiment illustrated in FIG. 3, each of the X and Y axes of the grid correspond to first and second color gradients, respectively. For example, the X axis may be associated with a color gradient that varies from lighter green to darker green with corresponding increase in X values, and the Y axis may be associated with a color gradient that varies from a lighter blue to a darker blue with corresponding increase in Y values. Of course, the blue and green colors are only an example and other colors may be used. The arrangement in FIG. 3 may be effective for use with display of white wines, whereas a different set of color gradients may be used for red wines, e.g., red for the X axis and blue for the Y axis. As a result, wines displayed in the upper right quadrant will have a display that includes darker shades of green and blue, whereas wines displayed in the lower left quadrant will include lighter shades of green and blue. Wines displayed in the lower right quadrant will include darker shades of green and lighter shades of blue, and wines displayed in the upper left quadrant will include lighter shades of green and darker shades of blue. Other variations of color gradients may be used, such as gradients that are darker with lower X and/or Y values and lighter with higher X and/or Y values, etc. In addition, a color gradient may include color changes with increasing X and/or Y values, e.g., the X axis may be associated with a color gradient that varies from light yellow to darker orange with increasing X values.

Figures 3, 4:
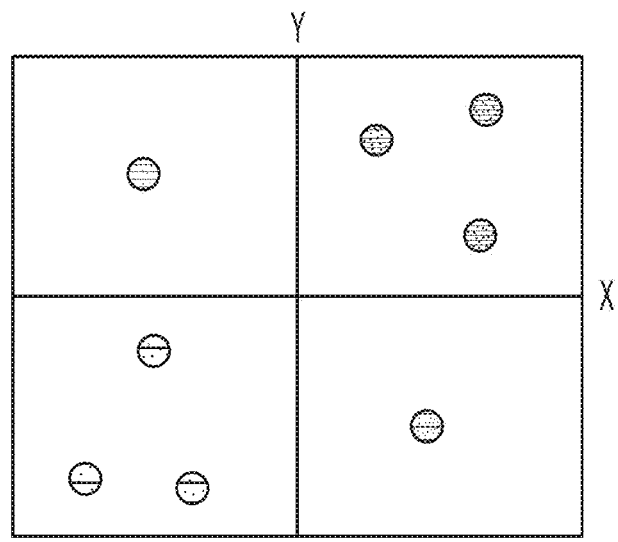
FIG. 3 shows an X-Y grid indicating multiple wines and employing a color gradient to indicate composite X and Y values for each of the wines.
FIG. 4 shows a chart for an item along with a set of characteristics, X and Y correlation values for the characteristics, weighting values for the characteristics and a set of composite X and Y values for the item.

The X and Y axis of the X-Y grid may be associated with any suitable characteristic or set of characteristics to provide a characterization of a wine or other item or moment. In the examples of FIGS. 3 and 4, the X axis is associated with a plurality of characteristics including climate, vintage, treatment, old vs. new world, and varietal characteristics (which are described in more detail below) and the Y axis is associated with alcohol level only. In this example, the X axis is said to vary from "earthy" to "fruity" values, and the Y axis is said to vary from "light" to "bold," although other descriptors could be used. Other combinations of characteristics may be used, as should be understood, particularly if the combination of characteristics provides useful information regarding a wine or other item's/moment's features. As an example, a tannin characteristic may be combined with alcohol level and associated with the Y axis instead of using alcohol level alone.

FIG. 4 illustrates how composite X and Y correlation values are determined for the wines displayed in FIG. 2. The composite X and Y correlation values are shown for Wine 2, but values for the other wines were determined in a similar way. X and Y correlation values for each characteristic of climate, vintage, treatment, old vs. new world, varietal and alcohol level are shown, and in this embodiment, each of the X and Y correlation values vary from 0 to 100 although other value scales may be employed. Also, in this embodiment, climate, vintage, treatment, old vs. new world and varietal correspond to the X axis, not the Y axis, and so Y correlation values for these characteristics are equal to 0. The same is true of alcohol level, except alcohol level corresponds to the Y axis only such that its X correlation value is 0. How these X and Y correlation values can be determined is discussed in more detail below, but the X and Y correlation values may be determined using objective information, subjective information, or a combination of both information types. To determine composite X and Y correlation values, the X and Y correlation values for each characteristic are combined in some way. In this illustrative embodiment, each of the X and Y correlation values are multiplied by a weighting value to determine weighted X and Y correlation values, and then the weighted X and Y correlation values are added together to determine the composite X and Y correlation values. Other approaches can be used to determine composite X and Y values and are discussed in more detail below. The weighting values generally indicate the influence each characteristic will have on the composite X and Y correlation values, but may also make adjustments for different scoring scales used for different characteristics. For example, if one characteristic was scored on a scale of 0 to 50 rather than 0 to 100, its weighting factor could be adjusted to effectively put the X and Y correlation values into the 0 to 100 scale. With the composite X and Y correlation values determined, each wine can be plotted on the X-Y grid, which in this case has the origin (X=0, Y=0) in the lower left corner, i.e., the X and Y axes intersect at (X=50, Y=50). It will be understood that any suitable scale or combination of scales could be used.

FIG. 5 shows a table indicating the characteristics climate, vintage, treatment, old vs. new world, varietal and alcohol level, and how these characteristics may be scored or valued to provide X and Y correlation values. (In the embodiment of FIGS. 2 and 4, the characteristics of climate, vintage, treatment, old vs. new world and varietal are not associated with the Y axis and so have 0 for Y weight and Y correlation values, but this need not be the case in other implementations. Similar is true of the alcohol level characteristic which is not associated with the X axis and so has 0 for the X weight and X correlation values.) In this embodiment, "climate" is a measure of how cool or warm a climate is and is based on the concept that warmer climates tend to produce fruitier wine. Here, the climate characteristic is determined on a scale of 0 to 100 and is determined as shown in FIG. 5 by multiplying a difference between an average climate temperature T for the region where the grapes are grown to make the wine in question and a minimum temperature MinT with a difference between a maximum temperature MaxT and MinT. The maximum and minimum temperatures MaxT and MinT are simply maximum and minimum temperatures used by the algorithm and in this example are 18 degrees C. and 8 degrees C., respectively. The values for MaxT and MinT may be varied as desired. In the example of FIG. 4, the region where the wine's grapes are grown has an average temperature T of 16 degrees C., which gives a correlation value of 80 (i.e., (16−8)*(18−8)=80). Other approaches for determining X and Y correlation values for climate are possible, however. For example, in one embodiment an initial climate value is determined on a scale of 0 to 5 in 0.5 value steps where 5 represents a warmest climate. The initial climate values may be determined using objective information, such as an average temperature for a vineyard location during a growing season to determine an initial climate value, or subjective information, such as an experienced panel of grape growers assessing different grape growing regions and assigning each a value on the 0-5 climate scale. In this alternate embodiment, an initial climate value between 0-5 may be multiplied by 20 to put the climate value on a scale of 0 to 100, and may be used as the X correlation value for climate. In the example of FIG. 4, if the wine's climate was assigned a climate value of "4," the correlation value for the climate characteristic would be 80, i.e., 4 multiplied by 20 to arrive at the X correlation value of 80. As noted above, the weight value for climate could be adjusted to account for other value scales, e.g., an X correlation value of "4" could be provided for climate, and a weight value of 6.0 used to provide the weighted X and Y correlation value suitable for use on the 0 to 100 scale.

The characteristic of "vintage" is a measure of the aging of the wine, and is based on the concept that more aging tends to produce an "earthier" flavor. In this embodiment, the vintage characteristic is measured on a scale of 0 to 100, with wines that are aged more being assessed with a lower initial vintage value and wines that are aged less being assessed and larger initial vintage value. In this embodiment of FIG. 4, the wine has an X correlation value of 55. FIG. 5 shows the algorithm used in this embodiment to determine the correlation values for the vintage characteristic. In the algorithm, CY is the current year (in this case 2018), V is the vintage or year the wine was bottled (in this case 2009), and the MAX function gives the larger of value of [20−(CY−V)] or 0. Thus, the wine in FIG. 4 has an X correlation value of 55. In this embodiment, vintages older than 20 years from the current year CY are assigned the same minimum value of 0, but this could be adjusted in any desirable way. In this embodiment, the vintage score returned by the MAX function has a maximum of 20 and so is multiplied by 5 to put the scoring on the 0 to 100 scale. However, if the scoring rule was adjusted to give different values for wines older than 20 years old, the vintage score returned by the MAX function can be multiplied by a different number to put the vintage correlation value on a scale of 0 to 100. For example, if the scoring rule were modified to provide different vintage correlation values for wines up to 40 years old, the scoring rule could be modified to 2.5*MAX[40−(CY−V), 0]. Of course other arrangements are possible, including use of non-linear scoring scales.)

The characteristic of "treatment" is a measure of whether the wine was treated in some way to provide an "earthier" quality, such as aging in oak barrels. In this embodiment, the treatment characteristic is measured on a scale of 0 to 100, with wines having a longest or more robust treatment assigned a 0 initial treatment value, wines having some treatment assigned a 1 initial treatment value, and wines with no treatment assigned a value of 2. The treatment scoring is multiplied by 50 to put the scoring on the 0 to 100 scale as shown in FIG. 5. The wine in FIG. 4 was assessed a 0 treatment correlation value. Initial treatment values may be assigned based on a region in which the wine is produced, and if no information is available regarding whether the wine's region provides treatment of this type, a default initial value of 1 may be used.

The characteristic of "new world vs. old world" is a measure of whether the wine is produced by an "old world" producer versus another producer since wine produced by "old world" producers tend to be "earthier." In this embodiment, "old vs. new world" scoring was on a 0 to 100 scale with old world producers assigned a 0 value and new world producers assigned a 100 value. Of course, other scales can be used. Determining whether a producer is old world or new world can be done in various ways, such as objectively depending on how long the producer has been operating continuously, or subjectively based on techniques or other features of the wine production that tend to align with more ancient techniques. In this example, if a wine comes from any European or Mediterranean country, the wine is determined to be an old world wine. Other wines are "new world." The wine in FIG. 4 was assigned a 100 value for the X correlation value.

The characteristic of "varietal" is a measure that reflects the notion that some grapes tend to produce fruitier or earthier flavor and/or that certain varieties of grapes are not well characterized by the algorithms used for climate, vintage, treatment and old vs. new world used above. Thus, the varietal characteristic is used in this embodiment as a sort of correction factor, and as explained more below, the weighting value for the varietal characteristic is negative. In this embodiment, the varietal characteristic was scored on a scale of 0 to 24 in steps of 12. That is, wines are categorized into three general groups under the varietal characteristic, with wines in Variety group A given a 0 correlation value, wines in Variety group B given a correlation value of 12, and wines in Variety group C given a correlation value of 24. The FIG. 4 wine was assigned to Variety A, which corresponds to the X correlation value of 0. A varietal characteristic could be determined objectively, such as by grape type or measured feature of a grape such as sugar content, water content, tannin content, etc., or subjectively based on expert taster opinion regarding the type of wine produced by each of a plurality of grapes.

The characteristic of "alcohol level" is a measure of the alcohol content of the wine, and in this embodiment is measured on a scale of 0 to 6, with an alcohol content of 10% given a 0 value and 16% given a 6 value. Each initial alcohol level value is multiplied by 16.66 to put the alcohol values on a scale of 0 to 100, and in this example the wine was assessed an initial value of 5, which corresponds to a value of 83 on a scale of 100. As with other characteristic measures, the alcohol level characteristic may be determined objectively, e.g., based simply on measured alcohol content, and/or subjectively, e.g., based on taster information that rates the apparent alcohol level based on each individual's taste. Since the alcohol level characteristic is related only to the Y axis, the X correlation value is 0 in this embodiment. If the alcohol level is not available, e.g., in a database, then an average alcohol level for the type of wine or wine region or of other wines in the region may be used instead, or the alcohol level may be actually measured and used to determine the alcohol level correlation values.

As shown in FIG. 4, each X and Y correlation value has a weighting value that is used to determine a weighted X and Y correlation value for each characteristic. The weighting value may indicate the influence each characteristic has on the determination of the composite X and Y correlation values, and/or may be arranged so that the composite X and Y correlation values will ultimately range from 1 to 100 or whatever other scale is used to measure an item or moment. In this example, the weighted X and Y correlation values are summed to determine the composite X and Y correlation values, which in this case are 59 for the composite X and 83 for the composite Y values. In this embodiment, the weighting values for alcohol level, climate, vintage, treatment and old vs. new world are positive, but the weighting value for varietal is negative. Thus, a relatively high set of correlation values for climate, vintage, treatment and old vs. new world may be adjusted downwardly for some varieties of grapes, such as a Malbec. Of course, the way in which correlation values are determined and the weighting values for them may be arranged in any suitable way, and different sets of characteristics may be used and associated with X and Y axes as desired. Any of the equations used to determine X and Y values can be either linear as described above, or non-linear as appropriate to the various factors.

Figures 6, 7:
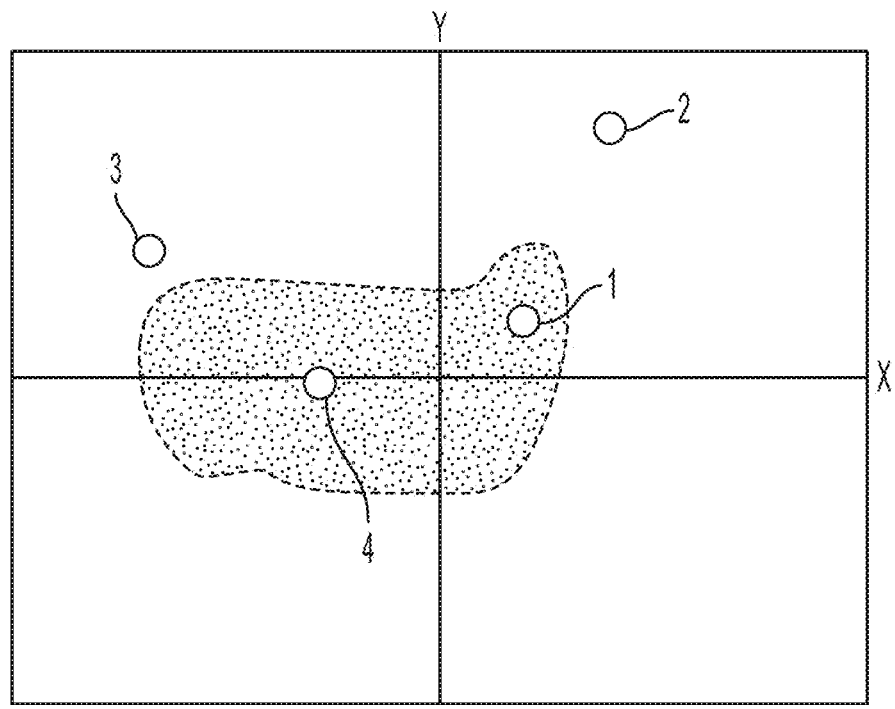
FIG. 6 shows a chart for a moment along with a set of characteristics, X and Y correlation values for the characteristics, weighting values for the characteristics and a set of composite X and Y values for the moment.
FIG. 7 shows a mapping of composite X and Y values for a moment on an X-Y grid and wines from the FIG. 2 X-Y grid illustrating how relationships between a moment and an item can be determined.

The general approach described above may be employed with not only wines but other items and moments so that the items/moments can be characterized with respect to an X-Y grid. FIG. 6 shows a table of X and Y correlation values for an item of "meatloaf dinner" although the FIG. 6 table approach could be used with any other suitable item or moment as will be discussed below. FIG. 6 shows a few characteristics that the item/moment may be assessed in relation to, but several 10's, 100's, 1000's or more characteristics may be employed. In this embodiment, each characteristic has a corresponding X and Y correlation value, i.e., the X and Y correlation values shown in FIG. 6 show how the particular characteristic is characterized in relation to the X-Y grid. In this example, the characteristic of "Mediterranean salad" has X and Y correlation values of 75 and 75, the characteristic of "pie crust" has X and Y correlation values of 75 and 50, the characteristic of "comfort" has X and Y correlation values of 50 and 50, and so on. Again, the X-Y grid used in this example is on the 0 to 100 scale used above. As discussed above, the X and Y correlation values for characteristics may be determined objectively, e.g., based on measured components or features of the characteristic, and/or subjectively, e.g., based on user input, expert input, combinations of layperson and expert input, people surveys, and so on. FIG. 6 also illustrates weighting values or factors for each characteristic. The weights may be provided for both X and Y axes, and the weighting values for each axis may be different. For example, in the embodiment of FIG. 4, weights for X and Y axes may be provided. For the "alcohol level" characteristic, the weight for the X axis would be 0 and the weight for the Y axis would be 1.0 so that the "alcohol level" characteristic is related to the Y axis only. In contrast, for the other characteristics, the weighting values for the X axis would be the weighting values shown, and the weighting values for the Y axis would be 0 so these characteristics are related to the X axis only. In the FIG. 6 embodiment, the weights are used to indicate the how closely the item or moment is correlated with the particular characteristic or how much influence the particular characteristic will have on the composite X and Y correlation values. In this example, the characteristics of "Mediterranean salad" and "comfort" are relatively closely correlated with the "meatloaf dinner" item, but other characteristics have a lesser correlation. To determine the composite X and Y correlation values in this example, the weighted X and Y correlation values can each be summed, and the result divided by the sum of the weights for X and Y, respectively. However, this is only one way to determine a composite X and Y value set, and other approaches are possible. For example, a statistical analysis of the X and Y correlation data and weighting values can be performed to determine the composite X and Y values. As an example, the weighting values can be treated as a number of occurrences for each corresponding X and Y correlation value, and a histogram of all X and Y correlation values for all characteristics can be produced using the weighting values as a frequency for each correlation value. Using the histogram, X and Y correlation values that have a highest number of occurrences may be selected as the composite X and Y correlation values. Note that X and Y correlation values may be assessed individually, i.e., all X correlation values are assessed as a group and all Y correlation values are assessed as a separate group, and the X and Y correlation values that occur the most may be selected as the composite X and Y values. Alternately, the X and Y correlation values may be assessed as permutational pairs, i.e., X and Y correlation value sets for each characteristic are not split apart, but are kept together as a pair, and all value pairs for all characteristics are compared to each other to determine which X and Y correlation value pair occurs most frequently to determine the composite X and Y correlation value for the item or moment. Other statistical analyses may be used as well, such as selecting the X and Y correlation value or value set that represents an average or mean, or other techniques. As a further example, X and Y correlation value pairs could be scatter plotted on an X-Y grid with frequency information determined based on weighting values for each correlation value pair. Frequency information could be indicated on the X-Y grid by varying a shading density on the display, e.g., more dense shading can indicate where correlation value pairs have higher frequency and less dense shading can indicate less frequency for correlation value pairs. This type of display can allow a user to visualize where an item or moment has stronger correlation or relationships with particular X-Y locations on the grid. Characterization information for other items and/or moments may be displayed on the same X-Y grid, thereby allowing a user to visualize where items and/or moments may have relationships with each other. For example, FIG. 7 illustrates a scatter plot of X and Y correlation value pairs for a moment along with the wines from FIG. 2. In this embodiment, the moment has X and Y correlation values that tend to cluster or be more frequent in the lower left quadrant, although there are X and Y correlation values occurring to the center of the X-Y grid and into the upper right quadrant. Wines 1 and 4 generally fall within the more dense X and Y correlation value occurrences for the moment, and so Wines 1 and 4 may be selected to have a suitably close relationship to the moment for a recommended pairing. Wines 2 and 3, on the other hand, are located away from the majority of X and Y correlation values for the moment and may be determined to have a weak relationship to the moment.

Relationships between items and/or moments can be determined by a user, e.g., by visualizing characterizations of the items and/or moments on an X-Y grid and selecting items and/or moments that have characterizations that are near each other. In other embodiments, relationships between items and/or moments can be determined by a computer system that assesses X and Y correlation values of items and/or moments and identifies items and/or moments that have X and Y correlation values that are similar. In some embodiments, a user may provide information to a computer system that represents an item or moment and a request for identification of another item or moment that has a relationship to the user-identified item or moment. As an example, a user may have one or more wines, e.g., in the user's cellar or which were brought by guests to a party, and the user can request a recommended pairing of an item and/or moment for the user-identified wine. The user can request the system to identify items (such as food items, party favors, etc.) and/or moments (such as a movie, music, game, activity, etc.) to accompany the wines. In response, the system can identify one or more items and/or moments to pair with the wines. After enjoying the recommended pairing, the user could provide feedback to the system, such as an indication of how well the wine and recommended item or moment were enjoyed together. The system can learn from this feedback, e.g., adjusting X and Y correlation values and/or weighting values for wines and/or other items or moments so that future recommendations can be better aligned with user feedback. Although in the example above a user is described as identifying a wine and requesting a recommendation for another item or moment to pair with the wine, the system could operate in the reverse direction, i.e., the user can identify an item or moment to the system and the system can identify one or more wines to pair with the user identified item or moment.

Figure 8:
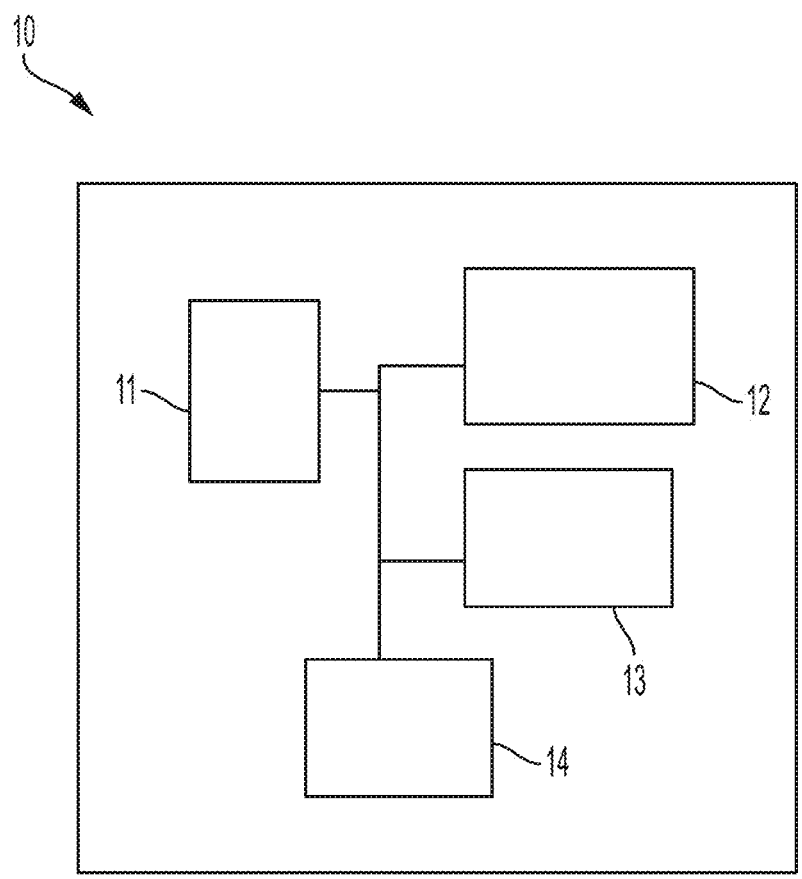
FIG. 8 shows a schematic diagram of a computerized system arranged to determine relationships between items and moments based on related item characteristics and moment characteristics.

FIG. 8 shows a schematic diagram of a computerized system for determining relationships between items and/or moments. In this illustrative embodiment, the system 10 may be implemented on one or more data processing devices, such as one or more general purpose computers that are programmed or otherwise have suitable executable instructions to cause the computer(s) to perform desired input/output functions, storage and retrieval functions, association or correlation of items with item characteristics and moments with moment characteristics, determining relationships between items and moments by performing the mapping engine functions, and so on. Thus, control of the system may be distributed as needed and performed by any suitable control circuitry, which may include a programmed general purpose computer and/or other data processing device along with suitable software or other operating instructions, one or more memories (including non-transient storage media that may store software and/or other operating instructions), a power supply for the control circuitry and/or other system components, input/output interfaces (e.g., such as a user interface 11 to display information to a user and/or receive input from a user), communication buses or other links, a display, switches, relays, triacs, motors, mechanical linkages and/or actuators, or other components necessary to perform desired input/output or other functions. Note that the system 10 may be implemented on one or more networks such as the Internet, cellular networks, local area networks, and any combination of networks. For example, in one embodiment an Internet-based server or other computer may perform mapping engine functions and receive information from, and send information to, a user via a user interface 11 that operates on a user's phone or other remote device and communicates with the server via a cellular network and/or the Internet.

The user interface 11 may be implemented in different ways and include a variety of different components as desired to perform different functions. For example, the user interface 11 could be implemented on a user's computer, such as a smartphone, and may be interacted with by the user to identify an item 1 or moment 4 to the system 10. In one embodiment, the user interface 11 can include an imaging device, such as a camera, that can image a label on a wine bottle as well as image analysis software to identify alphanumeric characters and/or other symbols on the label to determine various characteristics of the wine, such as the vineyard, region of origination, type of grape or blend of wine, vintage year, and so on. Thus, a user may use a smartphone to image a wine bottle's label so the user interface 11 can receive input from the user identifying a wine for which the user would like to receive a recommendation of a related moment or other item. Of course, the user may provide input to the user interface 11 in other ways, such as by keypad, voice input, etc. The user interface 11 may also receive information regarding wine and item characteristic information for the wine. In this embodiment, the imaging device may also or alternatively read and decode a machine readable feature, such as a barcode, and use the decoded information to retrieve desired characteristic information regarding the wine, such as by accessing a remote database or other information store via an Internet or other network connection. Alternately, or in addition, the user interface 11 may include a touch screen, keypad, microphone/speaker, etc. to receive input (whether by voice, touch, or other) from a user regarding a particular wine and its characteristics. Thus, in some cases the item characteristics associated with a wine or other item may be user defined, and/or may be defined by another third party source or sources (such as wine rating services or agents, or the wine vendor), or by various combinations of sources. Item characteristics from different sources may be weighted in different ways, e.g., a user's food characteristic information may be weighted more highly for certain types of characteristics such as taste information, but less highly for more objective information such as vintage or vineyard.

The item and item characteristic information including correlation information may be received, generated and/or stored by the item characteristic module 12. That is, the item characteristic module 12 may receive item identification information and/or item characteristic information for the item from the user interface 11 and may store that information in a database. Thus, correlation information may be generated by receiving input from a user, or retrieving correlation information from a database or other source. Alternately, the item characteristic module 12 may already have a set of item characteristic information for a plurality of items, and may thus receive only the item identification information from the user interface 11 to confirm that the item characteristic module 12 has suitable information to assess a relationship for the user-identified item. In some cases, the item characteristic module 12 may query a user or other source of information for item characteristic data, such as by instructing the user interface 11 to ask for certain types of user input, such as wine taste information which may then be correlated with the wine by the item characteristic module 12. The item characteristic module 12 may be implemented on the user's computer, e.g., smartphone, or may be implemented on a remote computer such as a server connected to the user's computer by the Internet or other network.

Similarly, the moment feature module 13 may receive, generate and/or store information regarding moments and moment characteristics. Such information may be provided by a user via the user interface 11, from remote or local databases or other information stores (e.g., data regarding holidays, sporting matches or other events may be obtained from desired sources, music or movie streaming services, or online shopping systems), or from other sources. A user may provide correlation information between moments and moment characteristics via the user interface 11 and the moment feature module 13 may generate and store correlation weighting or factor values accordingly. For example, while a "Christmas day" event may normally be associated with "cold" or "snow," this may not be true for a particular user's location, e.g., in the southern hemisphere, December 25 may typically be a warm day in the user's location. Thus, the moment feature module 13 may adjust correlation data based on user input, or other information such as the user's location, etc. Like the item characteristic module 12, the moment feature module 13 may be implemented on the user's computer, e.g., smartphone, or may be implemented on a remote computer such as a server connected to the user's computer by the Internet or other network.

The mapping engine 14 may use information from the item characteristic module 12 and the moment feature module 13 so that the mapping engine 14 can identify relationships between items and moments as requested by a user. Where the mapping engine 14 looks for direct textual matches between item characteristics and moment characteristics to identify a relationship between an item and moment, the mapping engine 14 may operate simply to compare item characteristic sets for different items to a moment characteristic set for a user-identified moment and identify items that have a sufficient number of matching terms with the moment as having a suitably strong relationship to the moment to warrant a recommendation. (Of course, where a user identifies an item and seeks a moment recommendation, the set of item characteristics for the user-identified item may be compared to moment characteristic sets for different moments.) However, as described above, other techniques for identifying correlations between item characteristics and moment characteristics may be employed by the mapping engine 14. For example, different item characteristic and moment characteristic terms may be associated with each other, e.g., according to different correlation factors, based on user input, neural network or other learning algorithm, system administrator or architect settings, and so on. Such correlations may be arbitrary, such as associating the item characteristic "spicy" with the moment characteristic "exciting," or may be based on textual analysis or word meaning, e.g., where an item characteristic and a moment characteristic are synonyms or determined by a natural language tool that the terms are connected in some way. Also, as noted above, the mapping engine 14 may employ a neural network or other learning-type or trainable algorithm that can be trained to define item characteristic and moment characteristic correlations based on training input that a particular item has a close or strong relationship with a particular moment or set of moments. Training may be done for a plurality of items that are identified as having a strong (or weak or otherwise identified) relationship to one or more moments, as well as for a plurality of moments that are identified as having a strong (or weak or otherwise identified) relationship to one or more items. Based on this information the neural network may adjust item characteristic/moment characteristic correlation values so that the mapping engine 14, when provided with a user-identified item or moment, will identify the predefined moment or item with which the item/moment has a strong relationship. Such training may be done for multiple moment/item combinations so as to build a neural network or other mapping engine 14 functionality, and input from one or more users may be used to train or otherwise build such a mapping engine 14. The mapping engine 14 may also use the techniques described in connection with FIGS. 4 and/or 6 to determine relationships between items and moments, e.g., where X and Y correlation values for characteristics may be used to determine similarities or relationships between items and moments.

The mapping engine 14 may be implemented on the user's computer, e.g., smartphone, or may be implemented on a remote computer such as a server connected to the user's computer by the Internet or other network. Operating the mapping engine 14 on an Internet server or equivalent arrangement may be desirable when seeking to have multiple users interact with the mapping engine 14, whether for training of the mapping engine 14 and/or for providing a more uniform recommendation product from the mapping engine 14 and/or for allowing for the ability to make centralized updates to the mapping engine 14 as well as to the item characteristic module 12 and moment feature module 13 information. As discussed above, the mapping engine 14 may not only adjust correlation values between item characteristics and moment characteristics, but may also adjust correlation values between items and item characteristics, and/or moments and moment characteristics when training or learning. Also, correlation factors between item characteristics and moment characteristics, and/or between items and item characteristics, and/or moments and moment characteristics may be different, at least in part, for different users. Thus, the mapping engine may provide a unique and customized recommendation experience for each user while employing a common architecture for all users.

It should also be appreciated that the mapping engine 14 can perform item and moment characterization using multiple characteristics, X and Y correlation values and weighting values to determine composite X and Y correlation values in any of the ways described above. For example, the item characteristic module 12 may store a suitable number of characteristics for items along with corresponding X and Y correlation values for each of the items. The item characteristic module 12 may also store identification information for a plurality of items along with corresponding X and Y weights for each of the item characteristics, i.e., to allow the mapping engine to determine composite X and Y correlation values for each of the items as discussed above. The same is true for the moment feature module 13, i.e., the module 13 may store a suitable number of characteristics for moments along with corresponding X and Y correlation values for each of the moments, as well as identification information for a plurality of moments and corresponding X and Y weights for each of the moment characteristics, i.e., to allow the mapping engine to determine composite X and Y correlation values for each of the moments as discussed above. The item characteristics module 12 and moment feature module 13 are conceptually split into two components in this description because these modules may operate differently, e.g., may store different sets of characteristics for items and moments. However, these module may operate in the same way in all or at least some ways, e.g., may use a same set of characteristics for items and moments and may use weights or other factors to specify how much influence each characteristics may have in the mapping or other characterization of each item and/or moment. Thus, the item characteristics module 12 and moment feature module 13 together are a characterization module that performs the functions of both modules 12 and 13.

While aspects of the invention have been shown and described with reference to illustrative embodiments, it will be understood by those skilled in the art that various changes in form and details may be made therein without departing from the scope of the invention encompassed by the appended claims.

The invention claimed is:

1. A system for mapping an item or moment on an X-Y grid, comprising:
 a characteristic module arranged to generate and store X and Y correlation values for each characteristic in a set of characteristics for each of a plurality items and moments, each moment being an event, an emotional experience and/or an activity, wherein the characteristic module is arranged to generate and store X and Y correlation values for each characteristic in a set of characteristics for a plurality of wines and to generate and store X and Y correlation values for each characteristic in a set of characteristics for a plurality of moments;
 a mapping engine arranged to determine composite X and Y values for each of the plurality of items and moments based on the X and Y correlation values for each characteristic in the set of characteristics for the item or moment; and
 a user interface arranged to display information on the X-Y grid indicating the composite X and Y values for at least some of the items or moments, or to provide information regarding a relationship between at least two items or moments based on the composite X and Y values for the at least two items or moments.

2. The system of claim 1, wherein the characteristic module is arranged to generate and store a weighting value for each X and Y correlation value for each characteristic, and wherein the mapping engine is arranged to determine the composite X and Y values for each of the plurality of items or moments based on the X and Y correlation values and the weighting value for each X and Y correlation value.

3. The system of claim 1, wherein the user interface is arranged to display information on the X-Y grid indicating the composite X and Y values for at least some of the items or moments.

4. The system of claim 1, wherein the user interface is arranged to provide information regarding a relationship between at least two items or moments based on the composite X and Y values for the at least two items or moments.

5. The system of claim 1, wherein the set of characteristics for the plurality of wines includes climate, vintage treatment, new vs. old world, varietal and alcohol level.

6. The system of claim 5, wherein the X correlation values for the characteristic of alcohol level for the wines are equal to zero, and Y correlation values for characteristics of climate, vintage treatment, new vs. old world and varietal for the wines are equal to zero.

7. The system of claim 5, wherein the characteristic module is arranged to generate and store a weighting value for each X and Y correlation value for each characteristic for the wines, and wherein the mapping engine is arranged to determine the composite X and Y values for each of the plurality of wines based on the X and Y correlation values and the weighting value for each X and Y correlation value.

8. The system of claim 5, wherein the user interface is arranged to display an indication for each of the plurality of wines on the X-Y grid that corresponds to the composite X and Y values for each of the plurality of wines.

9. The system of claim 1, wherein the user interface is arranged to provide information regarding a relationship between a wine and a moment based on the composite X and Y values for the wine and the moment.

10. The system of claim 9, wherein the user interface is arranged to recommend a pairing of the wine and the moment based on the composite X and Y values for the wine and the moment.

11. The system of claim 10, wherein the user interface is arranged to recommend the pairing if a difference between the composite X and Y values for the wine and the moment is below a threshold.

12. The system of claim 10, wherein the user interface is arranged to receive information from a user identifying the wine and a request for a recommended pairing for the wine, the user interface is arranged to identify the moment for the recommended pairing based on a comparison of the composite X and Y values for the wine with the composite X and Y values for the moment, and the user interface is arranged to indicate the moment as a recommended pairing for the wine based on the comparison.

13. The system of claim 10, wherein the user interface is arranged to receive information from a user identifying the moment and a request for a recommended pairing for the moment, the user interface is arranged to identify the wine for the recommended pairing based on a comparison of the composite X and Y values for the moment with the composite X and Y values for the wine, and the user interface is arranged to indicate the wine as a recommended pairing for the moment based on the comparison.

14. The system of claim 1, wherein the set of characteristics for each of the plurality of wines is different than the set of characteristics for each of the plurality of moments.

15. The system of claim 1, wherein the user interface is arranged to display information on the X-Y grid indicating the composite X and Y values for at least some of the items or moments, each of the X and Y axes of the grid corresponding to first and second color gradients, respectively, the information indicating composite X and Y values for an item or moment including a combination of the first and second color gradients.

16. The system of claim 15, wherein the first and second color gradients vary from a lighter shade to a darker shade with increasing values for the composite X and Y values, respectively.

17. The system of claim 16, wherein the user interface is arranged to display information on the X-Y grid indicating the composite X and Y values for a plurality of wines.

18. A computer-implemented method for mapping an item or moment on an X-Y grid, comprising:
  generating X and Y correlation values for each characteristic in a set of characteristics for each of a plurality items or moments, each moment being an event, an emotional experience and/or an activity, wherein the step of generating X and Y correlation values includes generating a weighting value for each X and Y correlation value for each characteristic;
  determining composite X and Y values for each of the plurality of items or moments based on the X and Y correlation values for each characteristic in the set of characteristics for the item or moment, wherein the step of determining composite X and Y values includes determining the composite X and Y values for each of the plurality of items or moments based on the X and Y correlation values and the weighting value for each X and Y correlation value, and includes, for each item or moment, multiplying each X and Y correlation value by the corresponding weighting value to determine weighted X and Y correlation values, and adding the weighted X and Y correlation values to determine the composite X and Y values; and
  displaying information on the X-Y grid indicating the composite X and Y values for at least some of the items or moments, or providing information regarding a relationship between at least two items or moments based on the composite X and Y values for the at least two items or moments.

19. The method of claim 18, comprising the step of displaying information on the X-Y grid which includes displaying information on the X-Y grid indicating the composite X and Y values for at least some of the items or moments.

20. The method of claim 18, comprising the step of providing information regarding a relationship which includes providing information regarding a relationship between at least two items or moments that have similar composite X and Y values.

21. The method of claim 18, wherein the step of generating X and Y correlation values includes generating X and Y correlation values for each characteristic in a set of characteristics for a plurality of wines.

22. The method of claim 21, wherein the set of characteristics includes climate, vintage treatment, new vs. old world, varietal and alcohol level.

23. The method of claim 22, wherein the X correlation values for the characteristic of alcohol level for the wines are equal to zero, and Y correlation values for characteristics of climate, vintage treatment, new vs. old world and varietal for the wines are equal to zero.

24. The method of claim 22, the step of generating X and Y correlation values includes generating a weighting value for each X and Y correlation value for each characteristic for the wines, and wherein the step of determining the composite X and Y values for each of the plurality of wines includes determining the composite X and Y values based on the X and Y correlation values and the weighting value for each X and Y correlation value.

25. The method of claim 22, comprising displaying an indication for each of the plurality of wines on the X-Y grid that corresponds to the composite X and Y values for each of the plurality of wines.

26. The method of claim 21, wherein the step of generating X and Y correlation values includes generating X and Y correlation values for each characteristic in a set of characteristics for a plurality of moments.

27. The method of claim 26, comprising providing information regarding a relationship between a wine and a moment based on a comparison of the composite X and Y values for the wine and the moment.

28. The method of claim 27, wherein the step of providing information regarding a relationship includes recommending a pairing of the wine and the moment based on the composite X and Y values for the wine and the moment.

29. The method of claim 28, comprising recommending the pairing if a difference between the composite X and Y values for the wine and the moment is below a threshold.

30. The method of claim 26, further comprising receiving information from a user identifying a wine and a request for a recommended pairing for the wine, the step of providing information regarding a relationship including identifying a moment for the recommended pairing based on a comparison of the composite X and Y values for the wine with the composite X and Y values for the moment, and indicating the moment as a recommended pairing for the wine based on the comparison.

31. The method of claim 26, further comprising receiving information from a user identifying a moment and a request for a recommended pairing for the moment, the step of providing information regarding a relationship including identifying a wine for the recommended pairing based on a comparison of the composite X and Y values for the moment with the composite X and Y values for the wine, and indicating the wine as a recommended pairing for the moment based on the comparison.

32. The method of claim 26, wherein the set of characteristics for each of the plurality of wines is different than the set of characteristics for each of the plurality of moments.

33. The method of claim 18, comprising displaying information on the X-Y grid indicating the composite X and Y values for at least some of the items or moments, each of the X and Y axes of the grid corresponding to first and second color gradients, respectively, the information indicating composite X and Y values for an item or moment including a combination of the first and second color gradients.

34. The method of claim 33, wherein the first and second color gradients vary from a lighter shade to a darker shade with increasing values for the composite X and Y values, respectively.

35. The method of claim 34, comprising displaying information on the X-Y grid indicating the composite X and Y values for a plurality of wines.

* * * * *